United States Patent
Ito et al.

(10) Patent No.: US 9,822,867 B2
(45) Date of Patent: Nov. 21, 2017

(54) GEAR CASE FOR MOTORCYCLE

(75) Inventors: Shinji Ito, Saitama (JP); Masufumi Kugai, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 1344 days.

(21) Appl. No.: 12/570,519

(22) Filed: Sep. 30, 2009

(65) Prior Publication Data

US 2010/0126306 A1 May 27, 2010

(30) Foreign Application Priority Data

Nov. 27, 2008 (JP) ................. 2008-301932

(51) Int. Cl.
*F16H 57/02* (2012.01)
*F16H 57/027* (2012.01)

(52) U.S. Cl.
CPC ........ *F16H 57/027* (2013.01); *Y10T 74/2188* (2015.01)

(58) Field of Classification Search
CPC ........ F16H 57/02; F16H 57/027; F16H 57/04; Y10T 74/2186; Y10T 74/2189
USPC .......... 74/606 A, 606 R; 184/6.5, 6.23, 6.12, 184/6.17, 7.1; 464/170, 171, 175, 177
See application file for complete search history.

(56) References Cited

U.S. PATENT DOCUMENTS

| | | | | |
|---|---|---|---|---|
| 3,686,973 | A * | 8/1972 | Davison et al. | 74/606 R |
| 4,468,979 | A * | 9/1984 | Inagaki et al. | 74/606 R |
| 5,690,084 | A * | 11/1997 | Gunji et al. | 123/572 |
| 6,557,438 | B2 * | 5/2003 | Maeda et al. | 74/606 R |
| 7,343,833 | B2 * | 3/2008 | Matsushima | 74/607 |
| 2004/0231925 | A1 * | 11/2004 | Matsushima | F01M 13/04 184/6.23 |

FOREIGN PATENT DOCUMENTS

| | | |
|---|---|---|
| JP | S61-59196 U | 4/1986 |
| JP | S61-85769 U | 6/1986 |
| JP | 2-393 Y2 | 1/1990 |
| JP | 11-082692 A | 3/1999 |
| JP | 11-303975 A | 11/1999 |
| JP | 2001-355424 A | 12/2001 |
| JP | 2008-075732 A | 4/2008 |

* cited by examiner

*Primary Examiner* — Richard W Ridley
*Assistant Examiner* — Brian McGovern
(74) *Attorney, Agent, or Firm* — Birch, Stewart, Kolasch & Birch, LLP

(57) ABSTRACT

A motorcycle wherein only air can be communicated between the inside and the outside of a gear case without increasing the size of the gear case. A gear case includes a gear case body and a gear case cover. The gear case body includes a breather chamber of a labyrinth structure which continues in a circumferential direction of a rear wheel and extends in an upward and downward direction. An upper end of the breather chamber is in communication with a breather path and is open to atmospheric air while a lower end of the breather chamber is in communication with a gear chamber through a slit extending in a widthwise direction of the rear wheel.

6 Claims, 12 Drawing Sheets

GEAR CASE FOR MOTORCYCLE

CROSS-REFERENCE TO RELATED APPLICATIONS

The present application claims priority under 35 USC 119 to Japanese Patent Application No. 2008-301932 filed on Nov. 27, 2008 the entire contents of which are hereby incorporated by reference.

BACKGROUND OF THE INVENTION

Field of the Invention

This invention relates to a motorcycle wherein a gear case which has a drive shaft driven by a power unit and in which gear wheels for transmitting rotation of the drive shaft to a rear wheel are accommodated is provided sidewardly of the rear wheel and the gear case includes a breather path which opens the inside of a gear chamber to the atmosphere.

Description of Background Art

Motorcycles include a drive shaft driving wherein driving force of a power unit is transmitted to a rear wheel (driving wheel) through a drive shaft. A gear case in which gear wheels for transmitting rotation of the drive shaft to the rear wheel are accommodated is provided sidewardly of the rear wheel.

Some vehicles of this type include oil for lubrication that is accommodated in the gear case and includes a breather mechanism for keeping the pressure in the gear case to a predetermined pressure. See, for example, Japanese Utility Model Publication No. Hei 2-393 and Japanese Patent Laid-Open No. 2008-75732.

In addition, not only air in the gear case but also lubricating oil in the gear case sometimes enters a path of the breather mechanism. It is desired to separate this oil and the air from each other so that only the air is communicated between the inside and the outside of the gear case.

However, in the breather mechanism as disclosed in Japanese Utility Model Publication No. Hei 2-393, a chamber which communicates the external air with the inside of the gear case is provided in the gear case body, and a communicating path extending obliquely upwardly is formed in a case cover which closes up a rear wheel side opening of the gear case body such that the chamber is communicated with the internal space of the gear case through the communicating path. Therefore, if oil enters the path, then the path along which air passes becomes narrower and the oil is sometimes discharged to the outside together with the air. As a countermeasure, the size of the chamber has been increased. Therefore, it is necessary to increase the size of the gear case.

Meanwhile, in the breather mechanism disclosed in Japanese Patent Laid-Open No. 2008-75732, a short breather hole extending in a substantially horizontal direction is formed in an upper portion of the gear case such that it is open to the external air through the breather tube. Therefore, the path along which the air is to pass is narrowed. Also in this instance, the oil is sometimes discharged to the outside together with the air. Thus, in order to increase the size of the path along which air is to pass as a countermeasure, it becomes necessary to increase the size of the gear case.

SUMMARY AND OBJECTS OF THE INVENTION

It is an object of an embodiment of the present invention to provide a motorcycle wherein only air can be communicated between the inside and the outside of a gear case without increasing the size of the gear case.

In order to solve the problem described above, according to an embodiment of the present invention, a motorcycle includes a gear case which has a drive shaft driven by a power unit and in gear wheels for transmitting rotation of the drive shaft to a rear wheel that cut, accommodated sidewardly of the rear wheel. The gear case includes a breather path which opens the inside of a gear chamber to the atmosphere and is characterized in that the gear case includes a gear case body and a gear case cover and the gear case body includes a breather chamber of a labyrinth structure which continues in a circumferential direction of the rear wheel and extends in an upward and downward direction such that an upper end of the breather chamber is communicated with the breather path while a lower end of the breather chamber is communicated with the gear chamber through a slit extending in a widthwise direction of the rear wheel.

According to an embodiment of the present invention, since the breather chamber of the labyrinth structure which continues in the circumferential direction of the rear wheel and extends in the upward and downward direction such that the upper end of the breather chamber is in communication with the breather path while the lower end of the breather chamber is in communication with the gear chamber through the slit extending in the widthwise direction of the rear wheel, circulation of air between the breather chamber and the gear chamber can be made smooth by the slit. Consequently, even if the size of the breather chamber is not increased, air and oil can be separated from each other efficiently by the breather chamber of the labyrinth structure and only the air can be circulated between the inside and the outside of the gear case while the appearance is not damaged.

In the configuration described above, the gear case body may have a through-hole formed therein which communicates an upper end of the breather chamber and the gear chamber with each other in an upward and downward direction. According to this configuration, oil advancing into the upper end of the breather chamber can be returned into the gear chamber through the through-hole.

Further, in the configuration described above, the breather path may be in communication with the upper end of the breather chamber on the upper side with respect to the through-hole. According to this configuration, oil immediately before it enters the breather path can be returned into the gear chamber through the through-hole.

Further, in the configuration described above, the motorcycle may have a breather tube connecting to the breather chamber through the breather path for opening the breather chamber to the atmosphere, and a lower end of the breather tube may be positioned on the upper side with respect to the center of an axle of the rear wheel. According to this configuration, even when the motorcycle runs on a poorly drained place, it is possible to prevent water from entering the breather tube.

Further, in the configuration described above, the labyrinth structure of the breather chamber may have a first projection provided continuously to the slit in the breather chamber and a second projection provided on a wall in the breather chamber on the side which opposes to the first projection. According to this configuration, the first projection makes it difficult for oil to advance into the breather chamber. Even if oil advances into the breather chamber, it is possible for the second projection to decrease the power of the oil thereby to make it easy to return the oil into the gear chamber.

Further, in the configuration described above, the gear case cover may have a communicating path provided therein which is opposed at an opening on one end side thereof to a lower end of the breather chamber that extends from the opening of the one end side thereof toward the inner side in a radial direction in the gear case cover and is opposed at an opening at the other end thereof to the gear chamber. According to this configuration, even if oil from the gear chamber comes up through the communicating path in addition to the slit, the breather chamber of the labyrinth structure can return the oil into the gear chamber before the oil is opened to the atmospheric air.

According to an embodiment of the present embodiment, since the gear case body of the gear case includes the breather chamber of the labyrinth structure which continues in the circumferential direction of the rear wheel and extends in the upward and downward direction such that the upper end of the breather chamber is in communication with the breather path while the lower end of the breather chamber is in communication with the gear chamber through the slit extending in the widthwise direction of the rear wheel, even if the size of the breather chamber is not increased, only air can be circulated between the inside and the outside of the gear case while the appearance is not damaged.

Further, since the gear case body has the through-hole formed therein which is in communication with the upper end of the breather chamber and the gear chamber with each other in the upward and downward direction, oil advancing into the upper end of the breather chamber can be returned into the gear chamber through the through-hole.

Further, since the breather path is in communication with the upper end of the breather chamber on the upper side with respect to the through-hole, oil immediately before it enters the breather path can be returned into the gear chamber through the through-hole.

Further, since the motorcycle has a breather tube connecting to the breather chamber through the breather path for opening the breather chamber to the atmosphere and the lower end of the breather tube is positioned on the upper side with respect to the center of the axle of the rear wheel, even when the motorcycle runs on a poorly drained place, it is possible to prevent water from entering the breather tube.

Further, since the labyrinth structure of the breather chamber has the first projection provided continuously to the slit in the breather chamber and the second projection provided on the wall in the breather chamber on the side which opposes to the first projection, the oil can be returned readily into the gear chamber.

Further, since the gear case cover has the communicating path provided therein which is opposed at the opening on the one end side thereof to the lower end of the breather chamber, that extends from the opening of the one end side thereof toward the inner side in a radial direction in the gear case cover and is opposed at the opening at the other end thereof to the gear chamber, even if oil from the gear chamber comes up through the communicating path in addition to the slit, the breather chamber of the labyrinth structure can return the oil into the gear chamber before the oil is opened to the atmospheric air.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, an embodiment of the present invention is described with reference to the accompanying drawings. It is to be noted that, in the following description, the direction such as the forward, rearward, leftward, rightward, upward, or downward direction is, a direction as viewed from a passenger of the vehicle body under normal operating conditions relative to the ground, and in the figures. An arrow mark F denotes the forward direction of the vehicle body while another arrow mark L denotes the leftward direction of the vehicle body and a further arrow mark U denotes the upward direction of the vehicle body.

Figure 1:
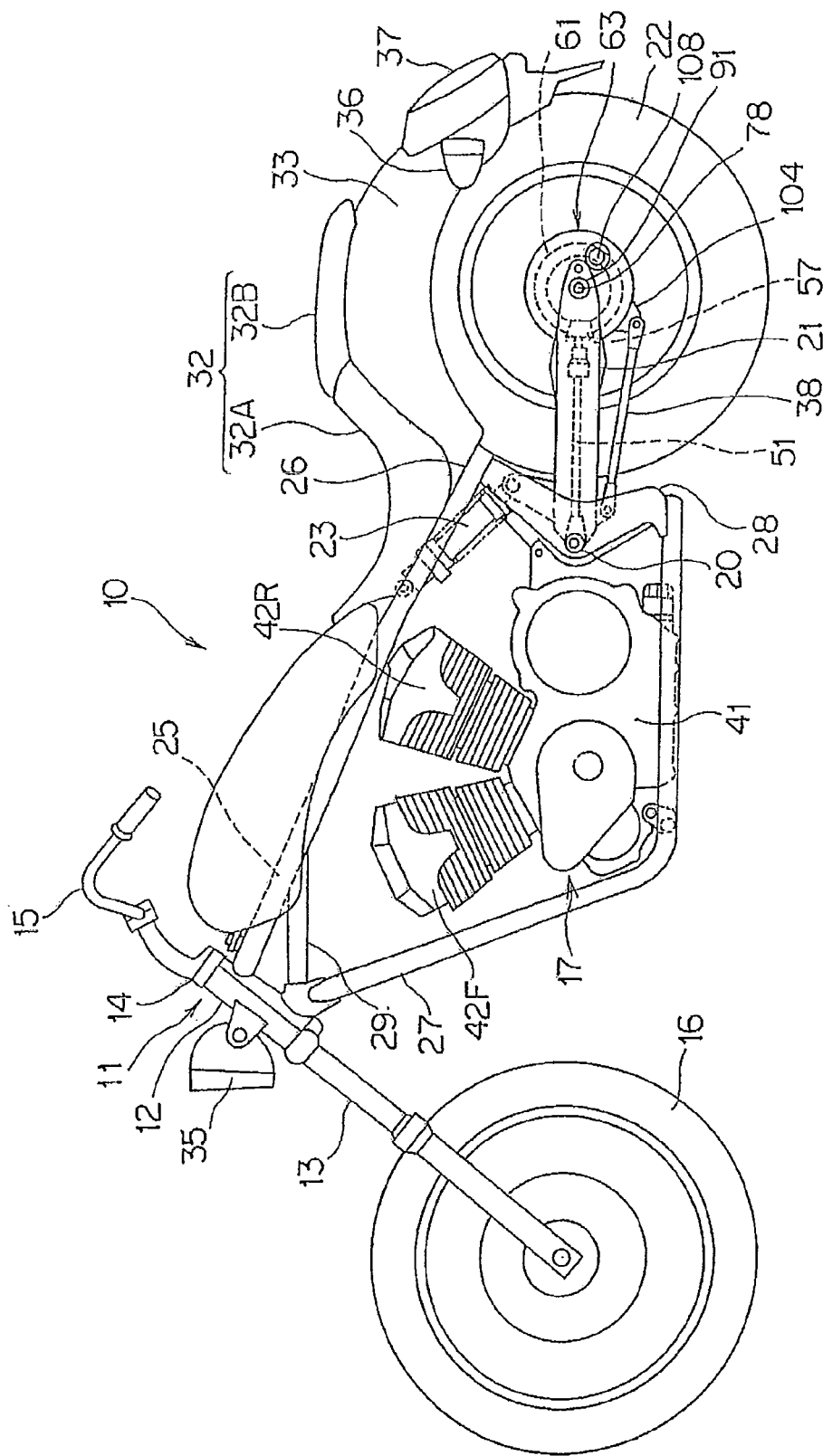
FIG. 1 is a side elevational view of a motorcycle according to an embodiment of the present invention.

FIG. 1 is a side elevational view of a motorcycle of the cruiser type according to an embodiment of the present invention.

The motorcycle 10 includes a vehicle body frame 11, a pair of left and right front forks 13 supported for pivotal motion on a head pipe 12 attached to a front end portion of the vehicle body frame 11, a handle bar 15 for a steering operation attached to a top bridge 14 which supports an upper end portion of the front forks 13, a front wheel 16 supported for rotation on the front forks 13, an engine (power unit) 17 supported on the vehicle body frame 11, a rear swing arm (also called rear fork) 21 supported for rocking motion on a pivot 20 at a rear lower portion of the vehicle body frame 11, a rear wheel (driving wheel) 22 supported for rotation at a rear end portion of the rear swing arm 21, and a rear shock absorber 23 interposed between the rear swing arm 21 and the vehicle body frame 11.

The vehicle body frame 11 includes a main frame 25 extending in a rearwardly descending relationship from the head pipe 12, a pair of left and right seat rails 26 extending rearwardly from a rear end portion of the main frame 25, a pair of left and right down frames 27 extending downwardly from the head pipe 12 and curved M such a manner as to extend substantially horizontally rearwards. A pair of left and right rear frames 28 (also referred to as pivot plates) are provided that connect to rear ends of the pair of left and right down frames 27 and rear ends of the seat rails 26. A fuel tank 31 is supported at a front portion of the main frame 25, and a seat 32 (driver's seat 32A and passenger's seat 32B) is supported rearwardly of the fuel tank 31. A rear fender 33 for covering the upper side of the rear wheel 22 is supported at a rear downward position of the seat 32.

It is to be noted that, in FIG. 1 a gusset member 29 is provided for reinforcing the vehicle body frame 11 together with a headlamp 35 a winker 36 and a tail lamp 37.

The engine 17 is supported in a space surrounded by the main frame 25, down frames 27 and rear frames 28, and is a V-type two-cylinder engine which includes a crankcase 41 and two cylinder sections 42F and 42R extending upwardly at a predetermined angle of nip at forward and backward positions of the vehicle body from the crankcase 41. It is to be noted that, in FIG. 1, an air cleaner or a fuel supplying system which forms an engine intake system, an exhaust pipe or an exhaust muffler which forms an engine exhaust system or the like is not shown.

In the present motorcycle 10, a shaft-drive type power transmission mechanism (hereinafter referred to as shaft drive apparatus) 50 is adopted as a power transmission mechanism for transmitting power of the engine 17 to the rear wheel 22.

Figure 2:
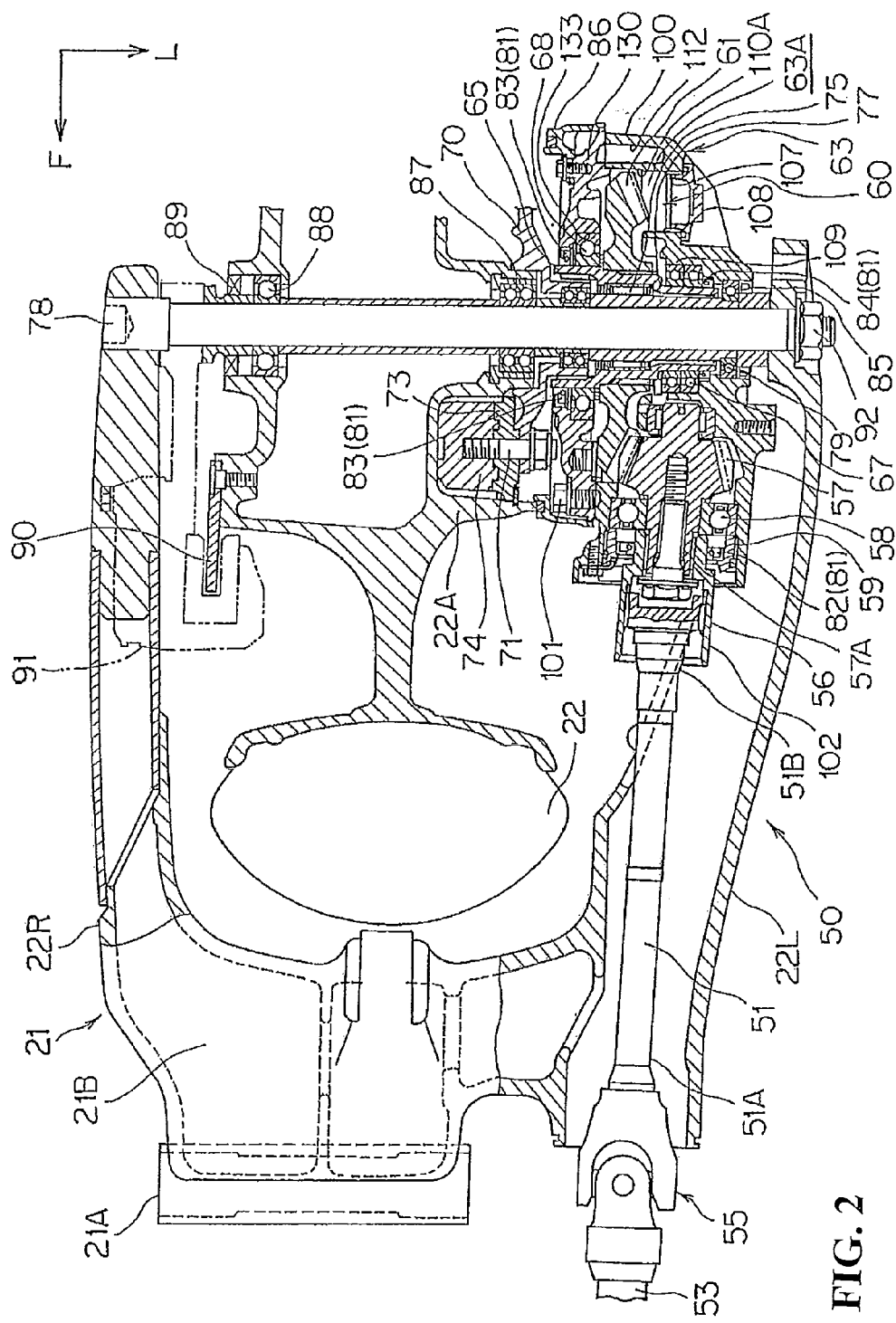
FIG. 2 is a sectional view showing a shaft drive apparatus together with peripheral components.

FIG. 2 is a sectional view showing the shaft drive apparatus 50 together with peripheral components such as the rear swing arm 21.

The rear swing arm 21 is formed from a connection of a pipe portion 21A supported between the pair of left and right rear frames 28 and a hollow member 21B formed from left and right extensions 22L and 22R integrally therewith and extending rearwardly from the pipe portion 21A.

The shaft drive apparatus 50 has a drive shaft 51 extending in the forward and backward direction through the inside of the extension 22L of the rear swing arm 21 and is an apparatus which transmits power of the engine 17 to the rear wheel 22 through the drive shaft 51. The configuration of the shaft drive apparatus 50 is roughly divided into the drive shaft 51 connected at a front end portion 51A thereof to an output power shaft 53 of the engine 17 through a universal joint 55 and a gear mechanism 60 for transmitting rotation of the drive shaft 51 to the rear wheel 22.

Figure 3:
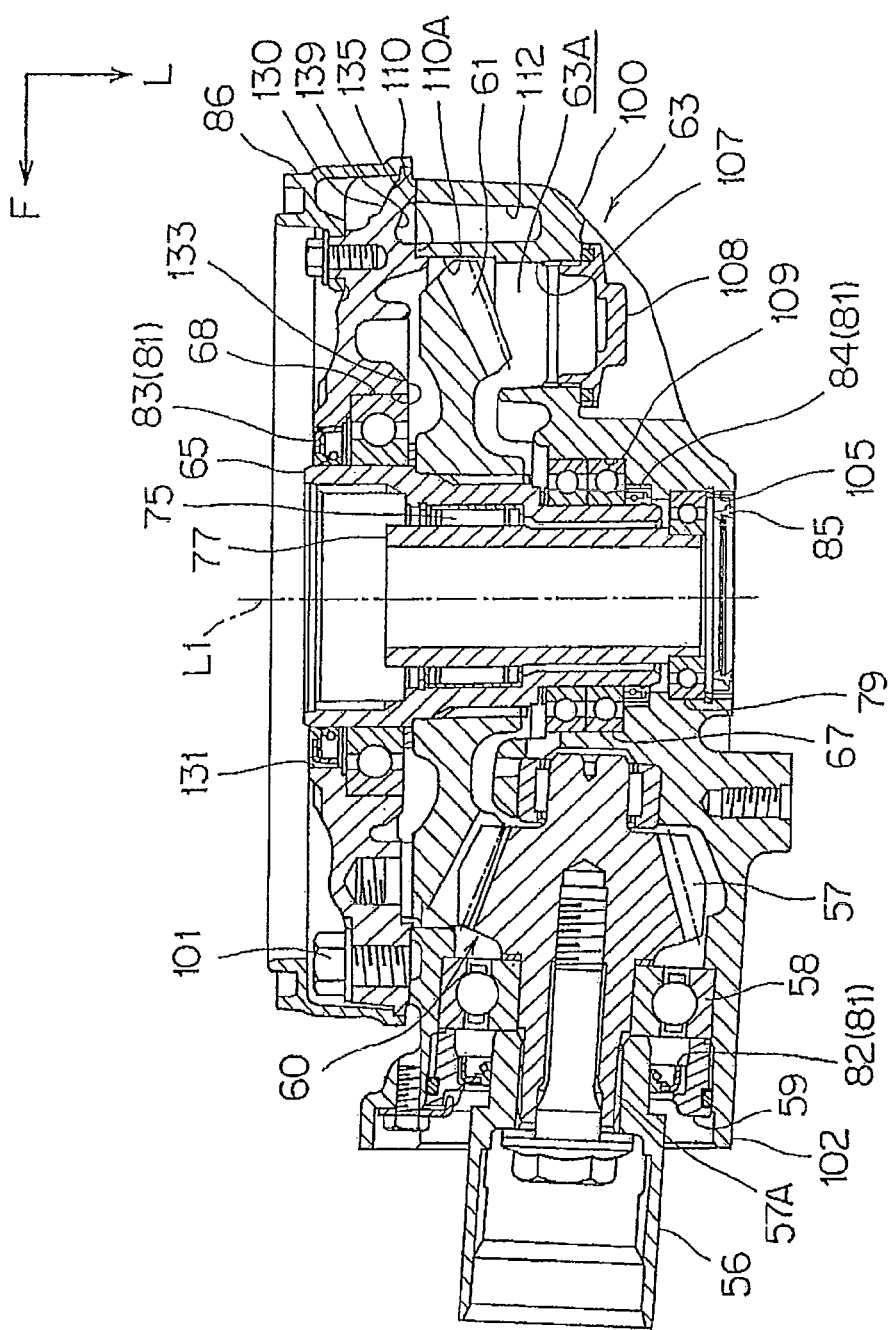
FIG. 3 is a sectional view showing a gear mechanism.

FIG. 3 is a sectional view showing the gear mechanism 60. As shown in FIG. 3, the gear mechanism 60 includes, as principal components thereof, a final gear wheel (referred to also as final driven gear wheel) 61 in the form of a bevel gear wheel which meshes with a drive gear wheel 57 connected to the rear end portion 51B (refer to FIG. 2) of the drive shaft 51 through a joint 56 to convert the transmission direction of the driving force, and a gear case 63 for accommodating the final gear wheel 61.

The final gear wheel 61 is pressed in a sleeve 65. The sleeve 65 is supported for rotation by bearings 67 and 68 disposed in the gear case 63 in a spaced relationship from each other in the axis direction (leftward and rightward direction of the vehicle body) of the sleeve 65. A damper holder 70 is attached to the sleeve 65 as shown in FIG. 2 such that it rotates integrally with the sleeve 65, and a damper member 73 and a driven flange 74 are attached to the damper holder 70 through a bolt 71, and the driven flange 74 is connected to a hub 22A of the rear wheel 22.

Further, as shown in FIG. 3, an axle collar 77 is supported for rotation on the inner circumference side of the sleeve 65 through a bearing (needle bearing) 75, and a rear wheel axle 78 is fitted in the inside of the axle collar 77. A bearing 79 is disposed also at a vehicle body outer side end portion (left end portion) of the gear case 63, and the rear wheel axle 78 is fitted in the bearing 79. It is to be noted that, for the bearings other than the bearing (needle bearing) 75, a ball bearing is adopted.

A buffer apparatus is provided between the final gear wheel 61 and the rear wheel 22. In the present embodiment, the buffer apparatus is a damper member 73 (refer to FIG. 2). This damper member 73 is interposed between the final gear wheel 61 and the hub 22A of the rear wheel 22 to moderate the variation when a great variation occurs with a transmission torque between the final gear wheel 61 and the rear wheel 22.

Consequently, the rotation of the output power shaft of the engine 17 rotates the drive shaft 51, and the rotation of the drive shaft 51 rotates the final gear wheel 61 through the drive gear wheel 57. Further, the rotation of the final gear wheel 61 is transmitted to the rear wheel 22 through the damper member 73 which serves as the buffer apparatus, to drive the rear wheel 22 to rotate.

As shown in FIG. 3, the drive gear wheel 57 connected to the rear side of the drive shaft 51 is accommodated for rotation through the bearing 58 in the front portion space of the gear case 63. In particular, the final gear wheel 61 and the drive gear wheel 57 are accommodated in the gear chamber 63A in the gear case 63.

Further, the gear chamber 63A of the gear case 63 is formed in an oil-enclosing structure by a plurality of seal members 81. In particular, an oil seal 82 for closing up the gap between the joint 56 and the case 63 (actually a holding member 59 of the bearing 58) on the case outer side (front side) with respect to the bearing 58 is provided at the front portion of the gear case 63, and another oil seal 83 for closing up the gap between the sleeve 65 and the gear case 63 on the case outer side (right side) with respect to the bearing 68 is provided at the rear wheel side end portion (right end portion) of the gear case 63. On the opposite side to the gear case 63, a further oil seal 84 for closing up the gap between the sleeve 65 and the gear case 63 on the case outer side (left side) with respect to the bearing 67 is provided. Further, a dust seal 85 is disposed on the case outer side (left side) of the bearing 79 disposed on the vehicle body left side with respect to the oil seal 84.

Further, a dust guard plate 86 in the form of a ring member is attached to the inner side (rear wheel 22 side) of the gear case 63, and a countermeasure against dust inwardly of the gear case 63 is provided by the dust guard plate 86. Consequently, the entire gear case 63 is formed in an oil enclosing structure adjacent to a dust preventing structure.

It is to be noted that, as shown in FIG. 2, a pair of left and right bearings 87 and 88 are provided on the inner periphery of the hub 22A of the rear wheel 22, and the rear wheel axle 78 is supported through the bearings 87 and 88. Further, a seal member 89 and a disk brake plate 90 are attached to the opposite side of the hub 22A to the gear case 63. It is to be noted that in the FIG. 2 a disk brake unit 91 is provided in the form of a caliper and a nut 92 is provided for fixing to the rear swing arm 21 of the rear wheel axle 78.

Now, the gear case 63 is described.

As shown in FIG. 1, the gear case 63 is supported on the rear wheel axle 78 and includes a rotation blocking mechanism formed from a torque rod 38 which extends in the forward and backward direction below the rear swing arm 21 and connects the gear case 63 and the rear swing arm 21 to each other.

Figure 4A:
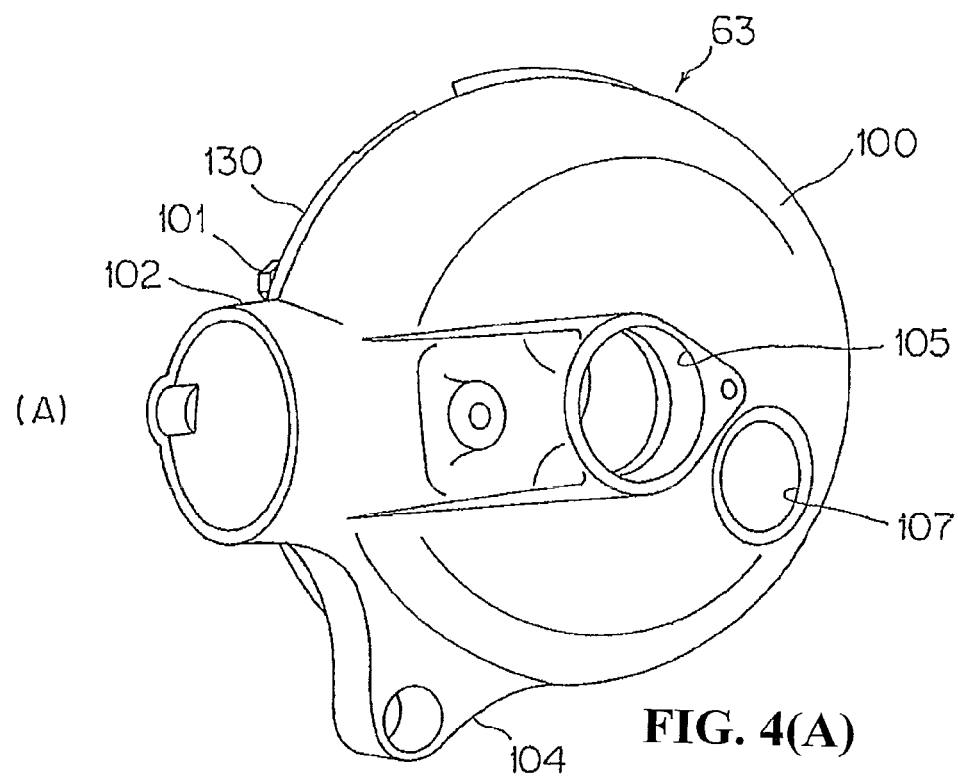
FIG. 4(A) is a perspective view of a gear case as viewed from the outer side (left side of the vehicle)
Figure 4B:
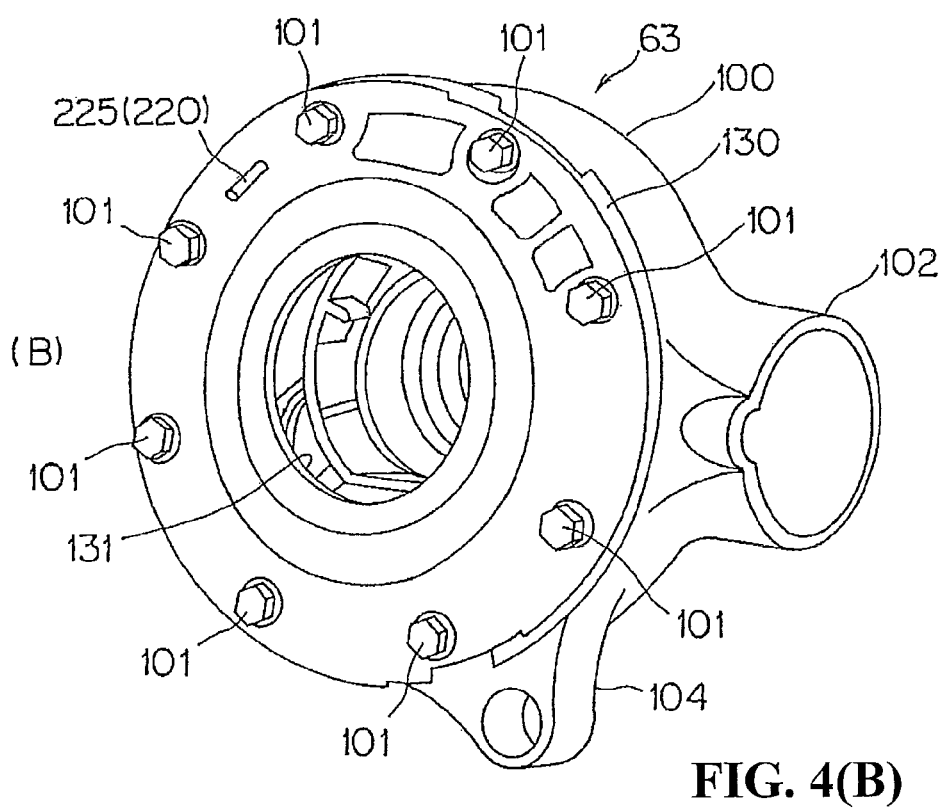
FIG. 4(B) is a view of the gear case as viewed from the inner side (right side of the vehicle body (rear wheel side))

FIGS. 4(A) and 4(B) show perspective views of the gear case 63 as viewed from the outer side (vehicle left side) and the inner side (vehicle body right side (rear wheel side)), respectively.

Figure 5:
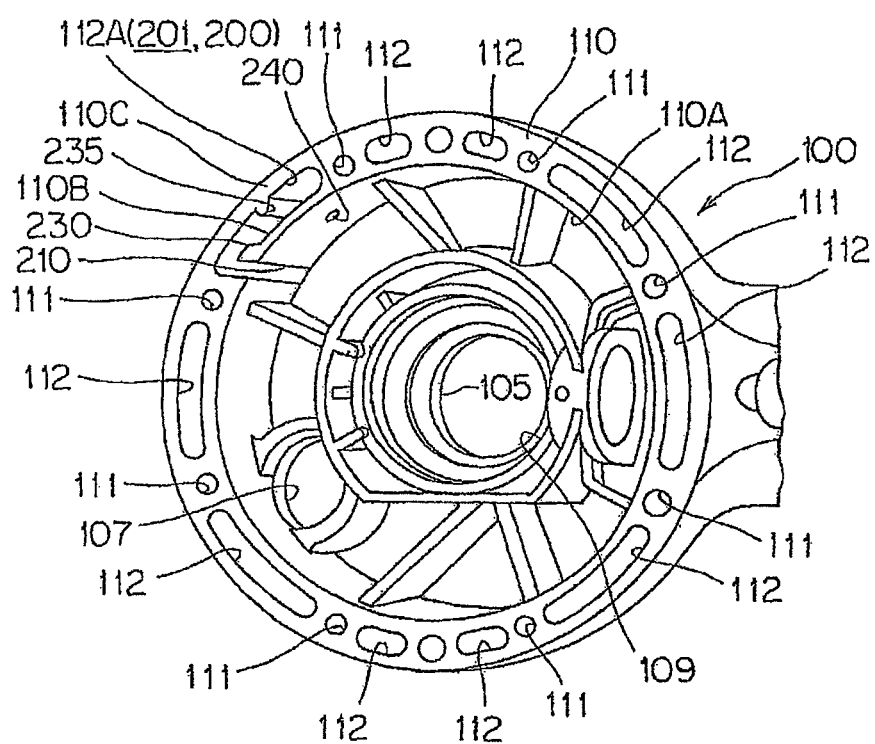
FIG. 5 is a perspective view showing an internal structure of a gear case body.
Figure 12:
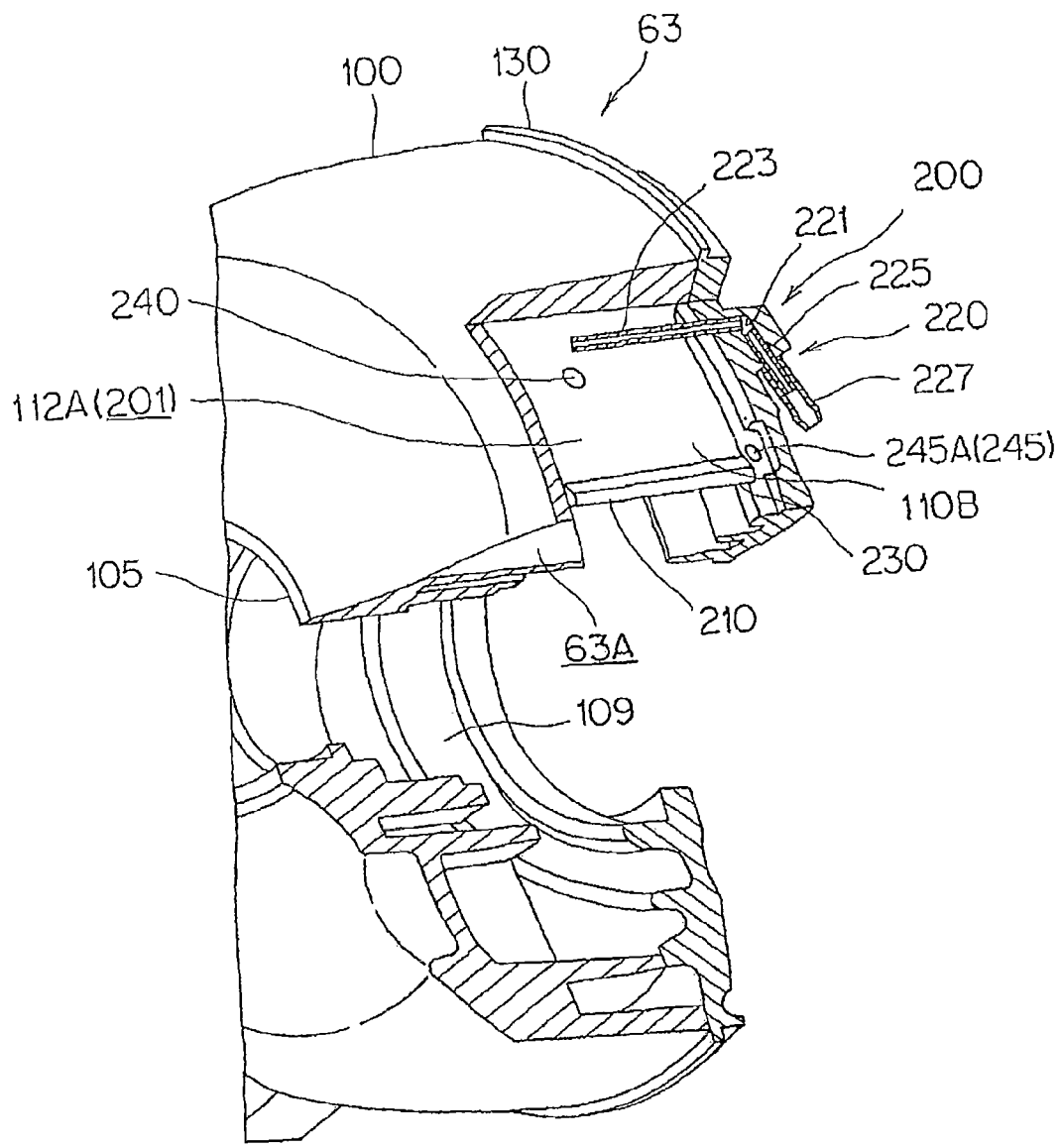
FIG. 12 is a view showing a breather chamber together with peripheral components with part of the gear case cut away.

The gear case 63 is composed of a gear case body 100 of a substantially cup shape and a gear case cover 130 substantially in the form of a disk for closing up a rear wheel side opening of the gear case body 100, and is formed in a leftwardly and rightwardly divided shape wherein the gear case body 100 functions as an outer side cover and the gear case cover 130 functions as an inner side cover. As illustrated in FIGS. 2, 3, 4(A), 4(B), 5-8, and 12, the gear case body 100 includes an axial dimension that extends along the rear wheel axle 78 (see, FIG. 2), a circumferential dimension that extends around the circumference of the gear case body 100 and a radial dimension that extends outwardly from the center of the gear case 63. In addition, the gear case body 100 includes a first side connected to the gear case cover and a second side extending axially therefrom. As illustrated in FIG. 12, the breather chamber 201 of a labyrinth structure is formed in the radial dimension of the gear case body 100. As illustrated in FIGS. 5 and 7, the breather chamber 201 continues a predetermined distance along the circumferential dimension of the gear case body 100 and includes an upper end and a lower end. The breather path 220 is positioned in the upper end of said breather chamber 201 for communicating an inside of the gear chamber to atmosphere. The elongated slit 210 is in the lower end of the breather chamber 201 and is open directly to the gear chamber 63A. The elongated slit 210 extends from the first side of the gear case body in the axial direction substantially across to the second side of the gear case body in the lower end of the breather chamber 201. A through-hole 240 extends radially through the gear case body 100 in an area adjacent to the breather path 220 in the upper end of said breather chamber 201 to be open directly into said gear chamber 63A for providing communication from the upper end of said breather chamber 201 to said gear chamber 63A in the radial dimension.

The gear case body 100 and the gear case cover 130 are connected to each other by a plurality of (eight in the example shown) bolts (fastening members) 101 tightened in a spaced relationship from each other in a circumferential direction from the gear case cover 130 side and the gear chamber 63A is formed in the inside of the gear case 63. Further, the gear case 63 includes a tubular portion 102 communicating with the gear chamber 63A in the inside of the gear case 63 and projecting in the forward direction, and the drive shaft 51 is fitted in the tubular portion 102 as shown in FIG. 2 and is connected to the drive gear wheel 57 in the gear chamber 63A through the joint 56 disposed in the tubular portion 102.

The gear case 63 further includes a torque rod connecting portion 104 projecting in a forwardly downward direction of the gear case 63 and having the torque rod 38 connected thereto, a pair of left and right central openings 105 and 131 through which the rear wheel axle 78 passes, and an oil pouring hole 107 positioned at a rear lower portion of the vehicle body with respect to the central openings 105 and 131. Oil for the lubrication is poured into the gear chamber 63A from the oil pouring hole 107 so that it is reserved into the inside of the gear chamber 63A. It is to be noted that the oil pouring hole 107 is normally closed up with a cap 108 (refer to FIG. 3).

Figure 6:
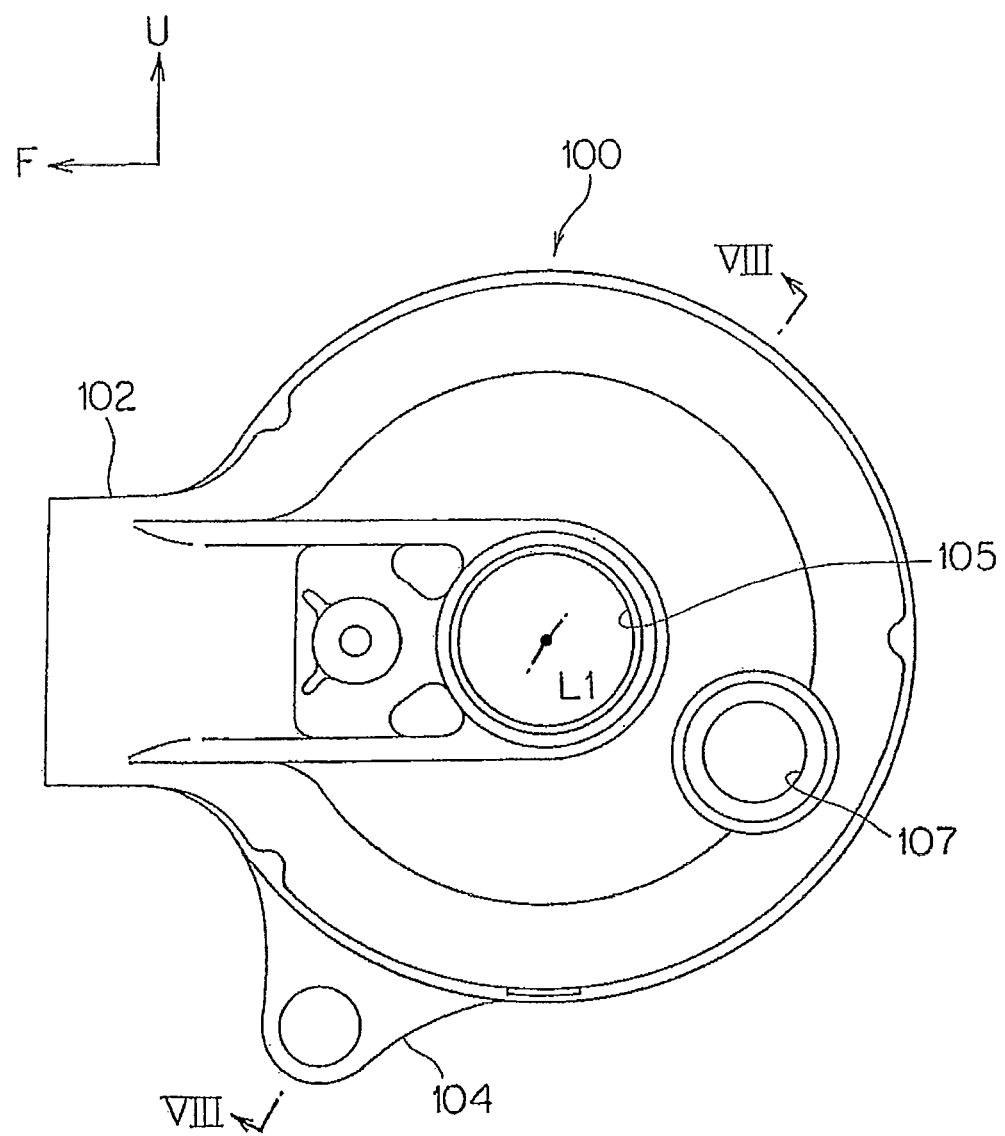
FIG. 6 is a view of the gear base body as viewed from the front side (left side of the vehicle body)
Figure 7:
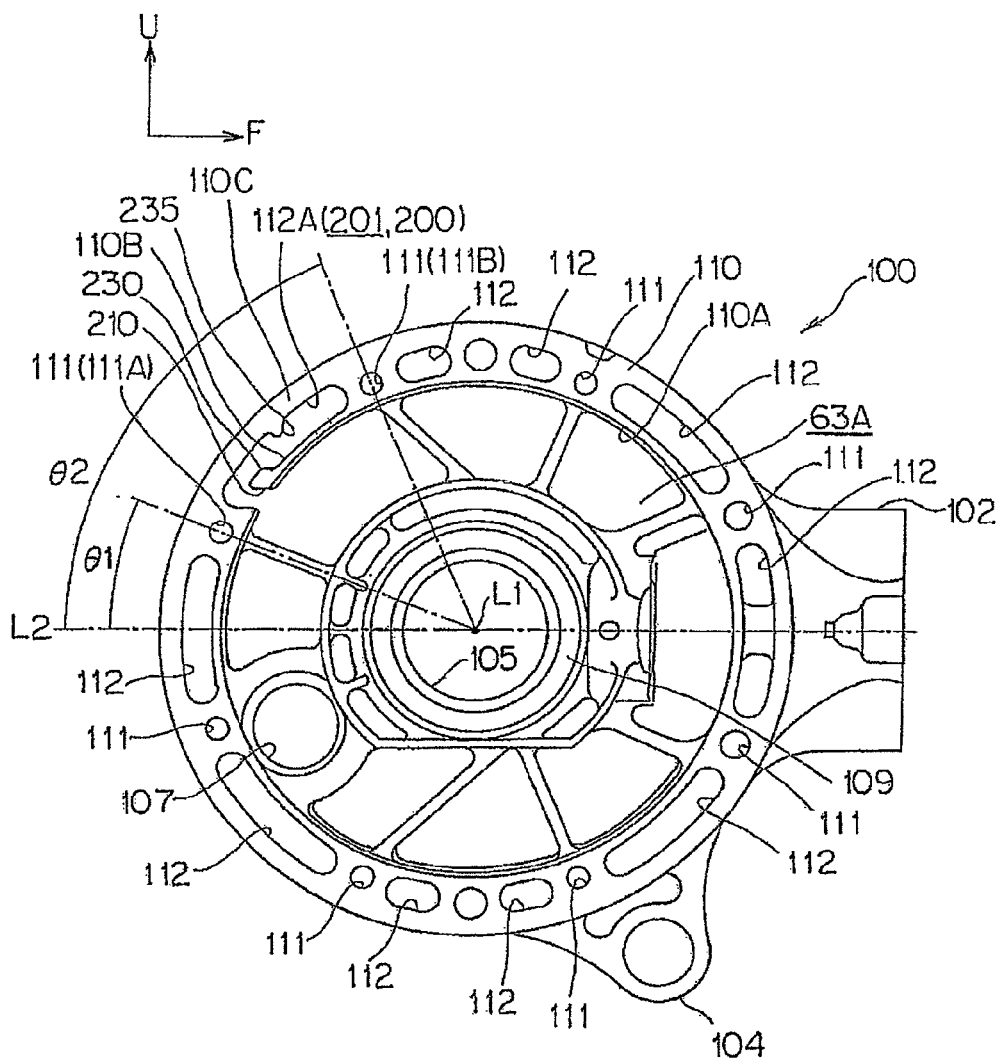
FIG. 7 is a view of the gear base body as viewed from the rear side (right side of the vehicle body)
Figure 8:
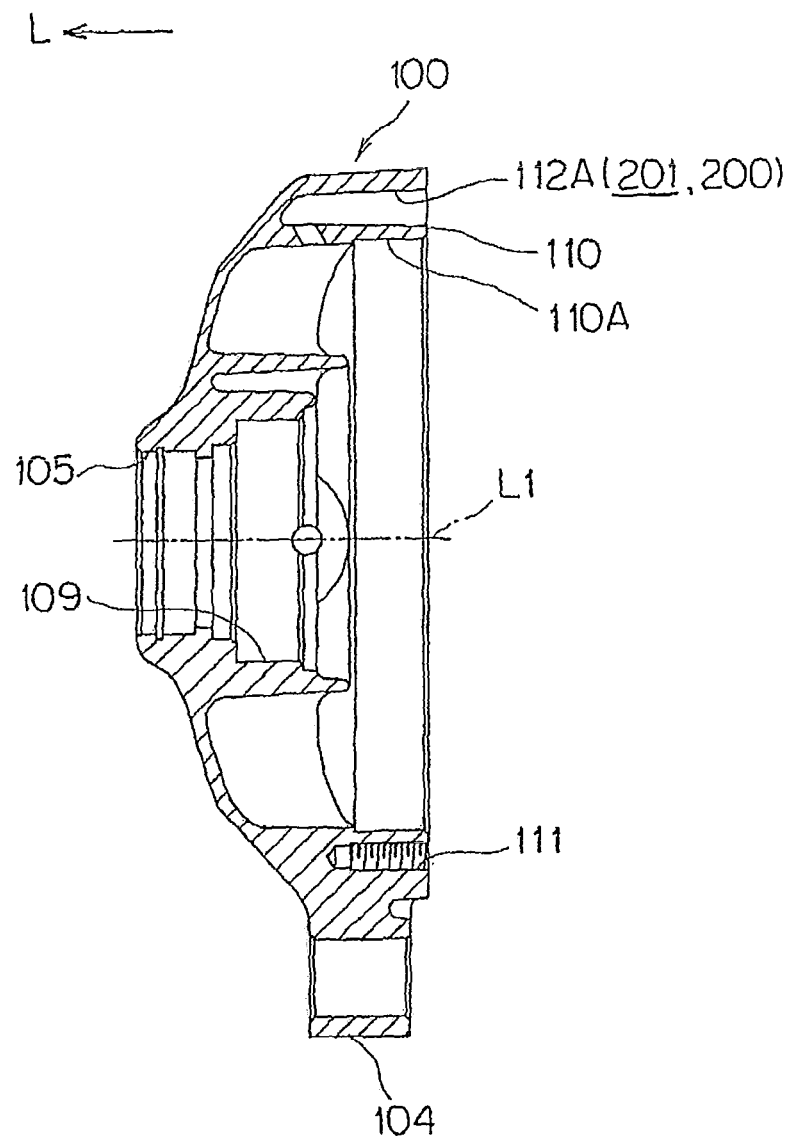
FIG. 8 is a sectional view taken along line VIII-VIII of FIG. 6.
Figure 9:
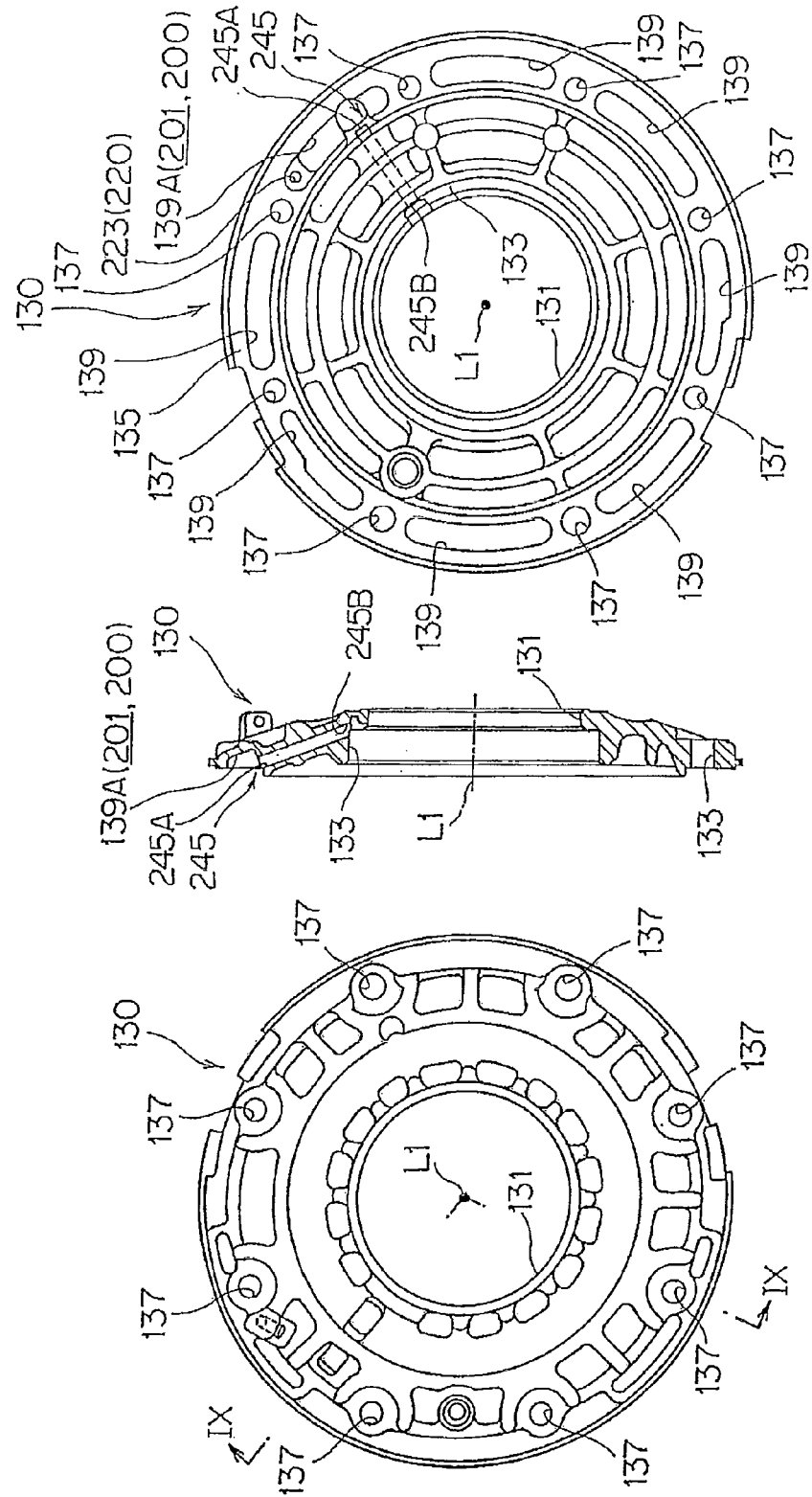
FIG. 9(A) is a view of a gear case cover as viewed from the front side (right side of the vehicle body)
FIG. 9(B) is a view of the gear case cover as viewed from the rear side (left side of the vehicle body)
FIG. 9(C) is a sectional view taken along IX-IX of FIG. 9(A)

FIGS. 5 to 8 show the gear case body, and FIGS. 9(A), 9(B) and 9(C) show the gear case cover 130. More particularly, FIG. 5 is a perspective view showing an internal structure of the gear case body 100, FIG. 6 is a view of the gear case body 100 as viewed from the front side (left side of the vehicle body), FIG. 7 is a view of the gear case body 100 as viewed from the rear side (right side of the vehicle body), and FIG. 8 is a sectional view taken along line VIII-VIII of FIG. 6. Further, FIG. 9(A) is a view of the gear case cover 130 as viewed from the front side (right side of the vehicle body), FIG. 9(B) is a view of the gear case cover 130 as viewed from the rear side (left side of the vehicle body), and FIG. 9(C) is a sectional view taken along line IX-IX of FIG. 9(A). It is to be noted that, in the figures mentioned, while the forward direction, leftward direction and upward direction of the vehicle body are represented by arrow marks F, L and U, respectively, the directions somewhat vary in response to rocking motion of the rear swing arm 21.

The gear case body 100 is formed as a unitary member by casting and is formed substantially in a cup shape having the center on the axial line (hereinafter referred to as rear wheel axis) L1 of the rear wheel axle 78. This gear case body 100 includes a part supporting portion 109 for supporting bearings 69 and 79, the oil seal 84 and so forth disposed between the gear case body 100 and the rear wheel axle 78, and a mating portion 110 of a comparatively greater thickness provided on the outer periphery side of the part supporting portion 109 and continuing annularly along an outer edge of the gear case body 100.

The gear case cover 130 mates with the gear case body 100 from the inner side.

As shown in FIG. 7, a plurality of (eight in the example shown) bolt fastening holes 111 are formed in an equidistantly spaced relationship (at intervals of 45 degrees) in the mating portion 110. By tightening the plurality of bolts 101 into the bolt fastening holes 111 in a state wherein the gear case cover 130 is mated with the mating portion 110. The gear chamber 63A described hereinabove is formed in the inner side of an inner circumference side wall face 110A of the mating portion 110.

Further, grooves 112 are formed between the plurality of bolt fastening holes 111 in the mating portion 110 such that they extend successively in a circumferential direction along the mating portion 110. The grooves 112 are formed as elongated grooves which are open only on the gear case cover 130 side thereof and do not extend through the mating portion 110 and have a depth by which they extend substantially fully in the widthwise direction of the gear case body 100 and function as so-called lightening holes for achieving a reduction in weight of the gear case body 100.

In the present embodiment, that one (denoted by a reference character 112A) of the grooves 112 which is positioned in an obliquely upward direction of the vehicle body with respect to the rear wheel axis L1 serves also as a breather chamber, and the inside of the gear chamber 63A is open to the atmosphere outside the gear case 63 through the groove 112A which serves as the breather chamber to form a breather mechanism 200 for holding the pressure in the gear case 63 at a predetermined pressure.

The groove 112A which forms the breather chamber is a groove extending continuously along a circumferential direction from an obliquely rearward position of the vehicle body with respect to the rear wheel axis L1 (groove between the bolt fastening hole 111A provided at a position of an angle θ1 (22.5 degrees) with reference to a substantially horizontal plane L2 which passes the axial line L and the bolt fastening hole 111B provided at a position of another angle θ2 (77.5 degrees)), in other words, has a shape of an elongated groove continuously extending in a forwardly ascending relationship at an obliquely rearward position of the vehicle body with respect to the rear wheel axis L1.

Since the groove 112A at an obliquely rearward position of the vehicle body with respect to the rear wheel axis L1 is used as the breather chamber (hereinafter referred to as breather chamber 201) in this manner, the breather chamber 201 can be provided at a position higher than that of the oil surface of oil reserved in the gear case 63. Further, since this groove 112A extends continuously in a forwardly ascending relationship at an obliquely rearward position of the vehicle body, the breather chamber 201 can be formed so as to include a path which extends upwardly along the direction of rotation of the final gear wheel 61.

As shown FIGS. 9(A) to 9(C), the gear case cover 130 is formed in a substantially disk shape. In addition, the gear case cover 130 is formed as a unitary member by casting similarly to the gear case body 100. The gear case cover 130 includes part supporting portions 133 for supporting the bearing 68, oil seal 83 and so forth disposed between the gear case cover 130 and the rear wheel axle 78, and a mating portion 135 of a comparatively greater thickness provided on the outer periphery side of the part supporting portions 133 and continuing annularly along an outer edge of the gear case cover 130.

In the mating portion 135, bolt fitting holes 137 in which the plurality of bolts 101 for connecting the gear case body 100 are fitted are formed in an equidistantly spaced relationship from each other such that the mating portion 135 and the gear case body 100 are connected to each other by bolts in a state wherein the mating portion 110 of the gear case body 100 is mated with the mating portion 135.

Also in the mating portion 135, grooves 139 which function as so-called lightening holes for reducing the weight of the gear case cover 130 are formed between the plurality of bolt fitting holes 137. In particular, the grooves 139 are formed as elongated grooves which extend continuously in a circumferential direction along the mating portion 135 of the gear case cover 130 and are open only on the gear case body 100 side but do not extend through the mating portion 135 and formed as deep grooves of a depth with which they extend in the widthwise direction of the gear case cover 130 as shown in FIG. 9(B).

Further, the grooves 139 of the gear case cover 130 include a groove (denoted by reference character 139A) which opposes to the groove 112A which serves also as the breather chamber of the gear case body 100, and also this groove 139A is in communication, when the gear case body 100 is connected, with the groove 112A such that it functions as part of the breather chamber 201.

In particular, the breather chamber 201 is formed from the groove 139A of the gear case cover 130 and the groove 112A of the gear case body 100. Thereby, a great dimension can be assured for the width (dimension in the leftward and rightward direction of the vehicle body) of the breather chamber 201 making use of the full width of the gear case cover 130. A greater dimension can be assured also for the chamber height and the chamber length (dimension along the circumferential direction of the rear wheel axis L1) of the breather chamber 201. Accordingly, the breather chamber 201 of a great volume can be assured without increasing the size of the gear case 63, and the appearance of the gear case 63 is not damaged.

Now, the breather mechanism 200 is described in detail.

This breather chamber 201 is in communication at a lower end thereof with the gear chamber 63A through a horizontally elongated slit 210 (refer to FIGS. 5 and 7) formed by cutting away the mating portion 110 of the gear case body 100 and is open at an upper end thereof to the atmosphere through a breather path 220 (refer to FIGS. 9(A) to 9(C) provided in the gear case cover 130.

More particularly, as shown in FIGS. 5 and 7, the mating portion 110 of the gear case body 100 has an inner circumference side portion (hereinafter referred to as partition wall 110B) which functions as a partition wall for partitioning the breather chamber 201 into the groove 112A and the gear chamber 63A. A portion of the partition wall 110B which corresponds to a lower end of the groove 112 is cut away fully in the widthwise direction to form the horizontally elongated slit 210. In particular, since the slit 210 is formed in the full width of the groove 112 which substantially forms the entire breather chamber 201, the breather chamber 201 and the gear chamber 63A can be in communication with each other through a large opening. Thus, the communication of air between the breather chamber 201 and the gear chamber 63A can be smoothed.

Figure 10:
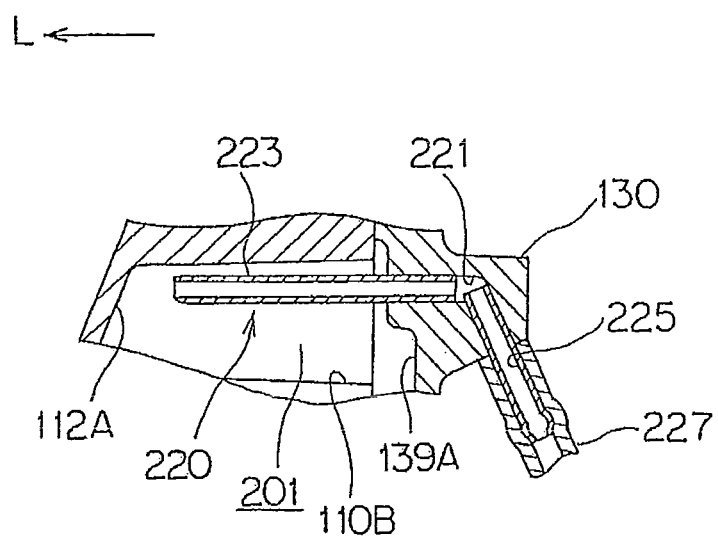
FIG. 10 is a view showing a breather path together with peripheral components.

Further, as shown in FIGS. 9(A) to 9(C), in the gear case cover 130, the breather path 220 for passing air in the vehicle widthwise direction therethrough is provided at an upper end portion of the groove 112A which forms the breather chamber 201. FIG. 10 is a sectional view showing this breather path 220 together with peripheral components. As shown in FIG. 10, the breather path 220 has a breather hole 221 provided at an upper portion of the gear case cover 130, a first pipe member 223 in communication with the breather chamber 201 side of the breather hole 221 and extending in the vehicle widthwise direction in the space at an upper end of the breather chamber 201, and a second pipe member 225 fitted on the opposite side of the breather hole 221 to the breather chamber 201 and extending in an inner-side obliquely downward (rear wheel side obliquely downward) direction. A breather tube 227 is connected to this second pipe member 225.

Figure 11:
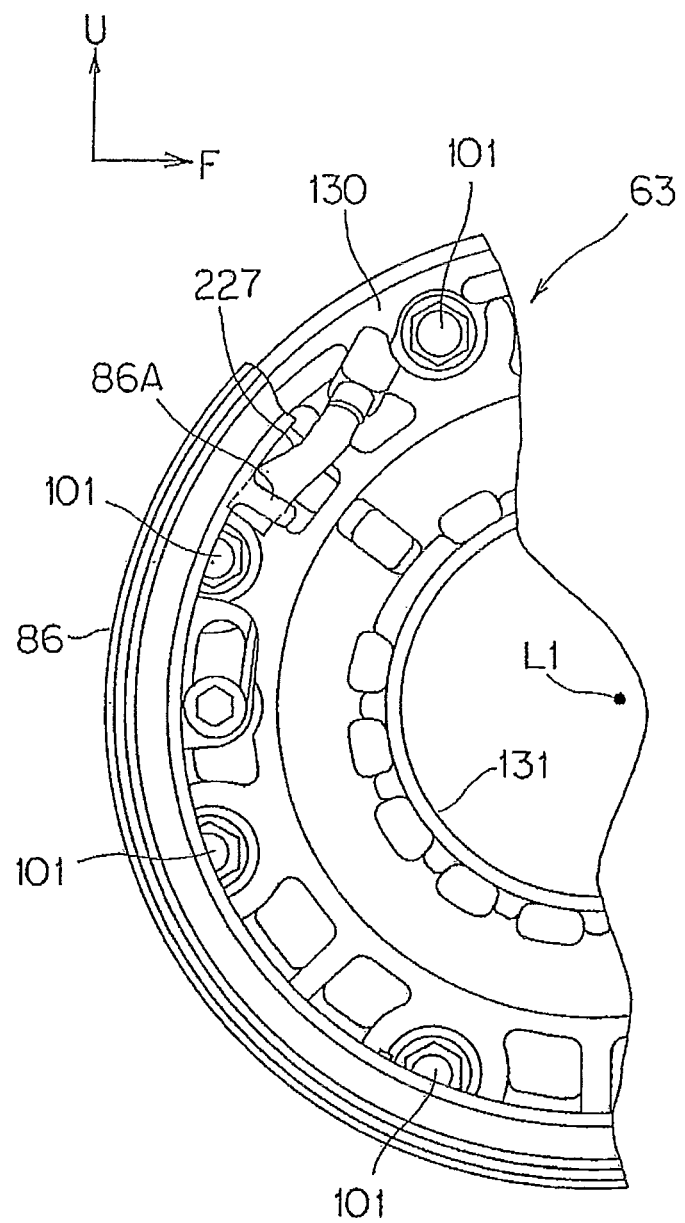
FIG. 11 is a view showing a breather tube together with peripheral components.

FIG. 11 is a view showing the breather tube 227 together with peripheral components. As shown in FIG. 11, the breather tube 227 is connected by inserting one end thereof into the second pipe member 225 from the outer side (rear wheel side) of the gear case cover 130 and is disposed in a downwardly state.

Since the breather tube 227 is formed by using a short tube of approximately several centimeters, the lower end thereof is positioned upwardly with respect to the rear wheel axis L1, and the lower end of this breather tube 227 is inserted into a ring-shaped tube insertion portion 86A formed integrally on the dust guard plate 86 attached to the gear case cover 130. Therefore, the breather tube 227 can be attached along the gear case cover 130, and the projection thereof to the rear wheel 22 side can be suppressed.

In this manner, in the present embodiment, since the breather chamber 201 is in communication at the lower end thereof with the gear chamber 63A through the slit 210 extending in the widthwise direction of the rear wheel 22 and is open at the upper end thereof to the atmosphere through the breather path 220, if the internal pressure of the gear chamber 63A becomes high, then a flow of air from the lower end to the upper end of the breather chamber 201 is generated in the breather chamber 201.

Further, the air path of the breather chamber 201 from the lower end toward the upper end is formed in a labyrinth structure which is a path in the form of a labyrinth. In particular, the breather chamber 201 includes a first projection 230 provided integrally with the partition wall 110B in a connecting relationship with an equal width with an upper edge of the slit 210 and projecting toward the outer circumference side of the rear wheel axis L1, and a second projection 235 projecting from a wall (outer periphery side portion of the mating portion 110) 110C in the breather chamber 201 on the opposing side to the first projection 230 to the rear wheel axis L1 side (inner periphery side) in the breather chamber 201. Therefore, the path from the lower end to the upper end of the breather chamber 201 is bent by the projections 230 and 235 thereby to form a labyrinth-like path.

FIG. 12 is a view showing the breather chamber 201 together with peripheral components with part of the gear case 63 cut away. As shown in FIG. 12, a through-hole 240 is provided in the partition wall 110B on the inner circumference side of the breather chamber 201 such that it extends upwardly and downwardly between the breather chamber 201 and the gear chamber 63A on the upper end side of the breather chamber 201. More particularly, the through-hole 240 is provided at a position rather lower than and in the proximity of an opening of the first pipe member 223 which forms one end side of the breather path 220 and functions as an oil returning hole for returning oil in this breather chamber 201 into the gear chamber 63A.

Further, a communicating path 245 is provided in the gear case cover 130 such that it is opposed at an opening 245A on one end side thereof sidewardly of the first projection 230 positioned at a lower end of the breather chamber 201, extends to the inner side in a diametrical direction in the gear case cover 130 from the opening 245A on this one end side and is opposed at an opening 245B (refer to FIGS. 9(B) and (C)) at the other end thereof to the gear chamber 63A. As shown in FIG. 9(B), the opening 245B on the inner circumference side of the communicating path 245 is communicated with a part supporting portion 133 of the gear case cover 130. More particularly, is connected to an outer peripheral angular portion of the bearing 68 (refer to FIG. 2) disposed between the gear case cover 130 and the rear wheel axle 78. In other words, the gear chamber 63A and the breather chamber 201 are in communication with each other not only by the path through the slit 210 but also by the communicating path 245 which passes the gear case cover 130.

Now, the operation of the breather mechanism 200 will be described.

When the final gear wheel 61 in the gear case 63 is driven from the engine 17 through the drive shaft 51 and the pressure in the gear case 63 becomes a little higher than the atmospheric pressure, then air in the gear case 63 enters the breather chamber 201 through the slit 210. In this instance, since a flow of air moving in the direction of rotation of the final gear wheel 61 and in a centrifugal direction is generated in the gear case 63 by the rotation of the final gear wheel 61, the air smoothly enters the breather chamber 201 through the horizontally elongated slit 210 formed in the outer periphery of the final gear wheel 61. Further, since not only the air but oil for lubrication exist in the gear case 63, also the oil during lubrication sometimes enters the breather chamber 201 together with the air.

In the present configuration, since the breather path on the upstream side with respect to the slit 210 is formed in a labyrinth structure wherein it is curved by a greater amount along the first projection 230 provided continuously to the slit 210 and is then curved by a greater amount by the second projection 235, the oil having a higher specific gravity than the air is more likely to be returned to the gear chamber 63A when it comes to the first projection 230. Further, even if some oil passes by the first projection 230 and flows to the upstream side, the power of the oil is further weakened by the labyrinth structure formed from the first projection 230 and the second projection 235. In addition, the oil is guided to the partition wall 110B of the inner circumference side of the breather chamber 201 provided by the second projection 235. Thus, the movement of the oil to the upstream side is suppressed.

In this instance, the oil on the partition wall 110B flows downwardly along the inclined face of the partition wall 110B by action of the gravity, and part of the oil drops from the through-hole 240 and returns to the gear chamber 63A. Then, the oil flowing down to the first projection 230 rides over the first projection 230 and returns to the gear chamber 63A, while the remaining part of the oil flows sidewardly along the first projection 230 and enters the communicating path 245. Thereafter the oil is returned to the gear chamber 63A through the communicating path 245. Since the oil passing through the communicating path 245 returns to the gear chamber 63A through the bearing 68 on the inner circumference side of the gear case cover 130, the bearing 68 can be lubricated efficiently with this oil.

Meanwhile, since the air is lower in specific gravity than the oil, the flow thereof is not disturbed so much as the oil and the air flows upwardly and is discharged to the outside through the breather path 220 and the breather tube 227. Consequently, the pressure in the gear chamber 63A is adjusted substantially to the atmospheric pressure.

In addition, the oil in the gear chamber 63A may possibly enter the breather chamber 201 through the communicating path 245. Since the power of the flow of the oil entering the breather chamber 201 through the communicating path 245 is reduced by the second projection 235, it drops from the through-hole 240 and returns to the gear chamber 63A similarly as described above, or rides over the first projection 230 and directly flows down into the gear chamber 63A. Further, the communicating path 245 functions not only as the oil path described above but also as an air path. In particular, the air in the gear chamber 63A is branched into that on the vehicle right side and that on the vehicle left side by the final gear wheel 61, and if the air pressure on the right side rises, then the air enters the breather chamber 201 through the communicating path 245 and flows to the left side of the gear chamber 63A. Consequently, the left and right air pressures in the gear chamber 63A can be kept equal to each other.

In this manner, in the present configuration, since the path for oil and air which connects the gear chamber 63A and the breather chamber 201 to each other is formed from two paths including the path which passes the slit 210 and the path which passes the communicating path 245, the two paths can be changed over in response to the pressure state in the gear chamber 63A between a state wherein both of the paths guide oil and air so as to flow from the gear chamber 63A to the breather chamber 201 (where internal air is discharged to the external air) or from the breather chamber 201 to the gear chamber 63A (where external air is introduced into the gear chamber 63A) and another state wherein one of the two paths guides oil and air so as to flow from the gear chamber 63A to the breather chamber 201 while the other one of the two paths guides oil and air so as to flow from the breather chamber 201 to the gear chamber 63A thereby to form a so-called circulating route.

In particular, where the difference between the air pressure in the gear chamber 63A and the atmospheric pressure is large, the gear chamber 63A and the external space are in communication with each other through the two paths and a wide breather path can be assured and the pressure in the gear chamber 63A can be balanced quickly with the atmospheric pressure.

On the other hand, where the difference between the air pressure in the gear chamber 63A and the atmospheric pressure is small, an oil circulating path can be formed wherein the flowing direction in one of the paths and the flowing direction in the other one of the paths become the opposite directions to each other such that oil from the one path is separated from air in the breather chamber 201 and then returns to the gear chamber 63A through the other path. In this instance, since the flow of the oil does not disturb the flow of the air, the air path can be assured sufficiently to balance the inside of the gear chamber 63A quickly with the atmospheric pressure.

As described above, in the present embodiment, since the gear case body 100 of the gear case 63 includes the breather chamber 201 of a labyrinth structure which continues in a circumferential direction of the rear wheel 22 and extends upwardly and downwardly and the breather chamber 201 is in communication at an upper end thereof with the breather path 220 and open to the atmospheric air and is in communication at a lower end thereof to the gear chamber 63A through the slit 210 which extends in a widthwise direction of the rear wheel 22, the communication of air between the breather chamber 201 and the gear chamber 63A can be carried out smoothly through the slit 210. In addition, since the breather chamber 201 has a labyrinth structure, even if oil enters the breather chamber 201, the oil entering the breather chamber 201 together with air can be separated and flows downwardly along the inclined face of the breather chamber 201. Consequently, the oil can be returned into the gear case 63 without being opened to the atmospheric air.

Accordingly, even if the size of the breather chamber 201 is not increased, air and oil can be separated from each other efficiently and only the air can be communicated between the inside and the outside of the gear case 63 while the appearance is not damaged.

Further, since the through-hole 240 which extends upwardly and downwardly between the upper end of the breather chamber 201 and the gear chamber 63A is provided in the gear case body 100, oil entering the upper end of the breather chamber 201 can be returned into the gear chamber 63A through the through-hole 240.

Further, since the breather path 220 is in communication with the upper end of the breather chamber 201 on the upper width with respect to the through-hole 240, oil immediately before entering the breather path 220 can be returned into the gear chamber 63A through the through-hole 240.

Further, since the lower end of the breather tube 227 connected to the breather path 220 is positioned upwardly with respect to the center of the axle (rear wheel axis L1), even when the vehicle is operated on a poorly drained place, it is possible to prevent water from entering the breather tube 227.

Further, since the labyrinth structure of the breather chamber 201 includes the first projection 230 provided in the breather chamber 201 in a continuous relationship to the slit 210 and the second projection 235 provided on the wall 100C on the side opposing to the first projection 230 in the breather chamber 201, it is made difficult by the first projection 230 for oil to advance into the breather chamber 201, and even if oil rides over the first projection 230 and advances into the breather chamber 201, the power of the oil can be lowered by the first projection 230 so that the oil is returned into the gear chamber 63A. Therefore, in comparison with an alternative case wherein the breather chamber 201 is not formed so as to have a labyrinth structure, a sufficient oil separating effect can be assured with a small volume.

Further, since the communicating path 245 which is opposed at the opening 245A on one end side thereof to the lower end of the breather chamber 201, extends to the inner side in a diametrical direction in the gear case cover 130 from the opening 245A on the one end side and is opposed at the opening 245B on the other end thereof to the gear chamber 63A is provided in the gear case cover 130, even if oil in the gear chamber 63A comes up through the communicating path 245 in addition to the slit 210, it can be returned into the gear chamber 63A by the breather chamber 201 of the labyrinth structure before it is open to the atmosphere.

In this instance, since the path which connects the gear chamber 63A and the breather chamber 201 to each other increases to two paths including the path which passes the slit 210 and the path which passes the communicating path 245, a route along which oil entering from one of the paths into the breather chamber 201 is returned to the gear chamber 63A through the other path can be formed. Consequently, the oil can be returned readily while the volume of the breather path is assured sufficiently. In addition, with the present configuration, since the communicating path 245 is in communication with the gear chamber 63A through the bearing 68 provided on the gear case cover 130, the bearing 68 can be lubricated efficiently with the oil which returns to the gear chamber 63A through the communicating path 245.

While the present invention has been described in connection with one embodiment thereof, the present invention is not limited to this but allows various design alterations. For example, while, in the embodiment described, one through-hole 240 is provided, the number of such through-holes 240 is not limited to one but a plurality of through-holes 240 may be provided and also the position of the through-hole 240 may be altered suitably. Further, the labyrinth structure of the breather chamber 201 is not limited to the configuration which has the first projection 230 and the second projection 235 described hereinabove, but another labyrinth structure such as a labyrinth structure which includes one such projection or three or more projections may be applied.

Further, while, in the embodiment described above, the present invention is applied to a gear case breather structure of the motorcycle 10 shown in FIG. 1, the present invention can be applied widely also to other vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gear case for use with a motorcycle comprising:
a gear case body having an axial dimension extending in an axial direction, a circumferential dimension and a radial dimension, said gear case body having a first side and a second side extending axially relative to the first side;
a gear case cover operatively connected to the first side of said gear case body;
a gear chamber formed within said gear case body;
a breather chamber of a labyrinth structure formed in the radial dimension of the gear case body and continuing a predetermined distance along the circumferential dimension of the gear case body, said breather chamber including an upper end and a lower end;
a breather path positioned in the upper end of the breather chamber for communicating an inside of the gear chamber to atmosphere;
an elongated slit positioned in the lower end of said breather chamber, said elongated slit being opened directly to said gear chamber, the elongated slit extends from the first side of the gear case body in the axial direction substantially across to the second side of the gear case body in the lower end of the breather chamber; and
a through-hole extending radially through the gear case body in an area adjacent to the breather path in the upper end of said breather chamber to be opened directly into said gear chamber for providing communication from the upper end of said breather chamber to said gear chamber in the radial dimension;
wherein the elongated slit opens inwardly through an inner circumferential partition wall of the breather chamber of the gear case body in the lower end of the breather chamber, and connects the lower end of the breather chamber to the gear chamber which is disposed radially inward with respect to the lower end of the breather chamber.

2. The gear case for use with a motorcycle according to claim 1, wherein said breather path is in communication with the upper end of said breather chamber on an upper side with respect to said through-hole.

3. The motorcycle according to claim 2, wherein the labyrinth structure of said breather chamber includes a first projection formed adjacent to the elongated slit on the inner circumferential partition wall of the breather chamber, and
a second projection provided on a wall in said breather chamber on the side which is radially outward from the inner circumferential partition wall of the breather chamber,
wherein the first projection extends continuously with the elongated slit in the axial dimension of the gear case body.

4. The gear case for use with a motorcycle according to claim 1, and further including a breather tube connecting to said breather chamber through said breather path for opening said breather chamber to the atmosphere.

5. The gear case for use with a motorcycle according to claim 1, wherein the labyrinth structure of said breather chamber includes a first projection provided continuously to said slit in said breather chamber and a second projection provided on a wall in said breather chamber on a side which opposes to said first projection.

6. A gear case for use with a motorcycle, comprising:
a gear case body having an axial dimension extending in an axial direction, a circumferential dimension and a radial dimension, said gear case body having a first side and a second side extending axially relative to the first side;
a gear case cover operatively connected to said gear case body;
a gear chamber formed within said gear case body;
a breather chamber of a labyrinth structure formed in the radial dimension and continuing a predetermined distance along the circumferential dimension of the gear case body, said breather chamber including an upper end and a lower end;
a breather path positioned in the upper end of said breather chamber for communicating an inside of the gear chamber to atmosphere;
an elongated slit positioned in the lower end of said breather chamber, said elongated slit being opened directly to said gear chamber, the elongated slit extends from the first side of the gear case body in the axial direction substantially across to the second side of the gear case body in the lower end of the breather chamber; and
a through-hole extending radially through the gear case body in an area adjacent to the breather path in the upper end of said breather chamber to be open directly into said gear chamber for providing communication from the upper end of said breather chamber to said gear chamber in the radial dimension;
wherein the elongated slit opens inwardly through an inner circumferential partition wall of the breather chamber of the gear case body in the lower end of the breather chamber, and connects the lower end of the breather chamber to the gear chamber which is disposed radially inward with respect to the lower end of the breather chamber,
wherein said gear case cover includes a communicating path provided therein which is opposed at a first opening on one end side thereof to the lower end of said breather chamber, extends from the first opening of the one end side thereof toward an inner side in a direction that is seen to be radial in said gear case cover when the gear case cover is viewed along the axial dimension of the gear case body, and is opposed at a second opening at an opposite end thereof to said gear chamber.

* * * * *